Feb. 28, 1939.   R. PASTERNACK ET AL   2,148,874
PREPARATION OF CRYSTALLINE ANHYDROUS CITRIC ACID
Filed Dec. 10, 1937
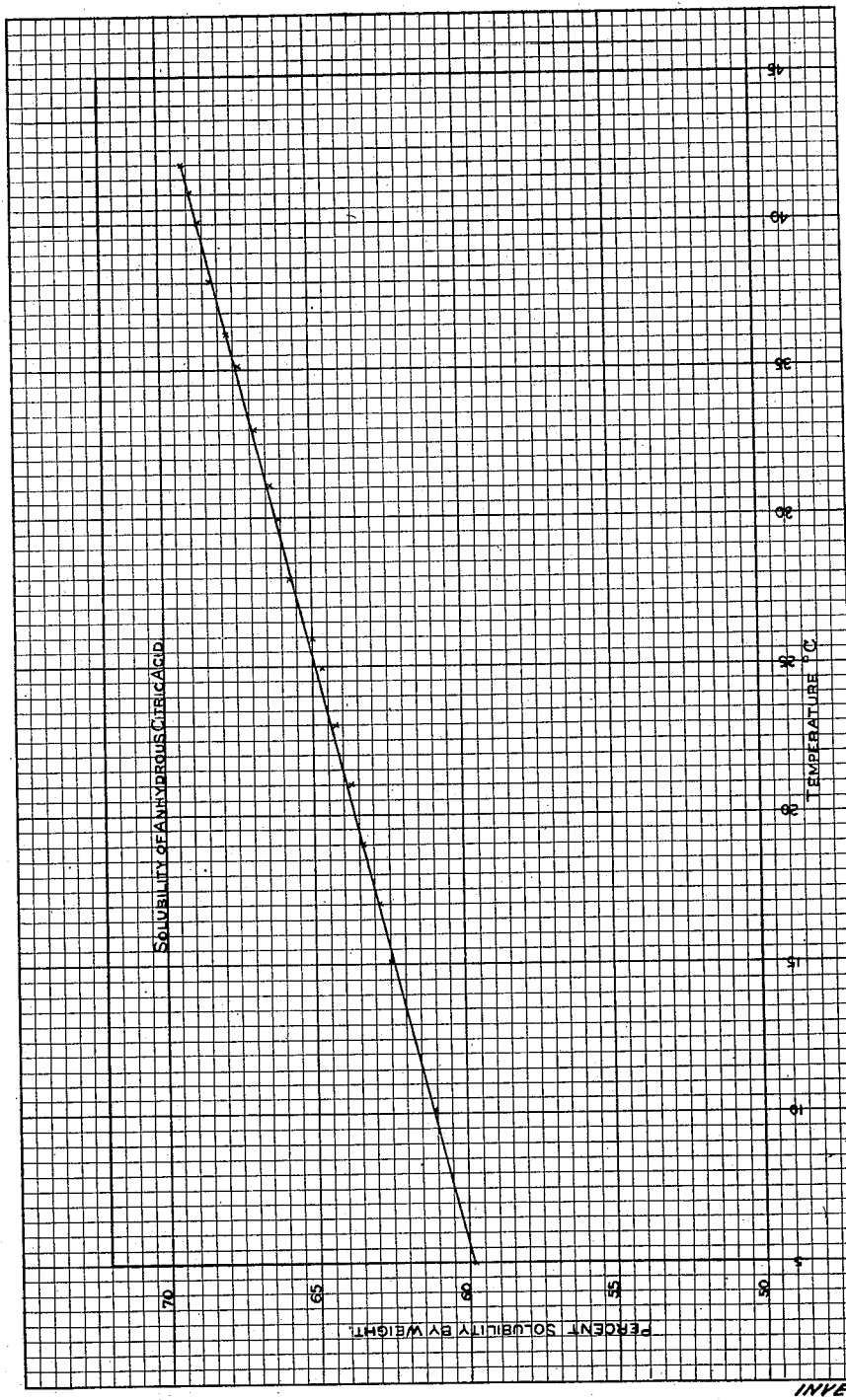
INVENTORS
RICHARD PASTERNACK + JOHN C. L. BLAGG
BY Sager & Malcolm
ATTORNEYS Patented Feb. 28, 1939

2,148,874

UNITED STATES PATENT OFFICE 2,148,874

PREPARATION OF CRYSTALLINE ANHYDROUS CITRIC ACID

Richard Pasternack, Brooklyn, and John C. L. Blagg, New York, N. Y., assignors to Charles Pfizer & Company, Brooklyn, N. Y., a corporation of New Jersey Application December 10, 1937, Serial No. 179,062

4 Claims. (Cl. 260—535)

This invention relates to the preparation of crystalline anhydrous citric acid and has for its object to provide an improved process for this purpose.

In U. S. Patent No. 1,965,429 it is disclosed that anhydrous citric acid may be prepared by crystallizing citric acid from solution at temperatures between 41° and 100° C. We have now found that by the application of special conditions not disclosed in said patent it is also possible to obtain anhydrous citric acid at any temperature between 41° C. and 5° C.

In U. S. Patent No. 2,030,619 it is stated that by the addition of a special mixture of citric and sulfuric acids in the form of an aqueous solution preferably containing in each 100 liters 18 kg. of citric acid monohydrate and 25 liters of concentrated sulfuric acid, hydration of citric acid in an aqueous magma at room temperature may be prevented. However, the amount of this mixture required to prevent hydration is not disclosed. Applicants have found that even when using such a quantity that the ratio of sulfuric acid to the water present in the magma after the addition of the mixture is higher than two to five, complete rehydration occurs at 22° C. Moreover, the sulfuric acid is a serious contaminant and the cause of additional expense both for materials and operation. Our present process does not require the use of additional reagents such as sulfuric acid, yet the magma may be cooled considerably below room temperature without causing hydration of the solid phase.

It is well known in the art that in a system citric acid-water, the stable solid phase at ordinary temperature is citric acid monohydrate, and our experience has shown that under the operating conditions of U. S. Patent No. 1,965,429, the monohydrate may be obtained at temperatures up to 40.6° C. However, we have now found that in the complete absence of hydrated citric acid an aqueous magma of anhydrous citric acid prepared above 41° C. may be cooled as low as 5° C., yet will remain anhydrous and the further crystals which form during cooling below the conversion point will also be anhydrous. The essential feature of our process, therefore, is the complete exclusion of hydrated citric acid during the entire process of crystallization and isolation. In a citric acid factory hydrated citric acid can never be completely excluded from the magma without the observance of special precautions. Even the factory air, although apparently entirely clear, will contain sufficient hydrated citric acid to cause rehydration. The elimination of hydrated citric acid in accordance with our process can be accomplished in a number of ways, as for example by working in completely sealed vessels which have been freed from possible hydrated citric acid contamination by steaming or by dry heating.

The following procedure will serve to illustrate one example of the conditions required for the crystallization of anhydrous citric acid from its aqueous solutions according to our invention:

Example 1

An aqueous solution containing 1500 g. of citric acid monohydrate in 1300 cc. of water is concentrated by boiling under an absolute pressure of about 2½ inches of mercury. The boiling range is about 50° to 65° C., the temperature rising as concentration proceeds. The evaporation is continued until only about 220 cc. of water is left. The magma is then cooled with stirring. After being in contact with the mother liquor for some 10 hours at a final temperature of 25° C., it is centrifuged and washed with a saturated citric acid solution free from any traces of solid hydrated citric acid. The product is dried either in a sealed apparatus from which hydrated citric acid is excluded, or under ordinary conditions at above 41° C. The titer of the product is above 109% calculated as the hydrated acid. The theoretical content of pure anhydrous citric acid is 109.38%. Further crops of anhydrous crystals may be obtained from the mother liquor by applying the same process.

Example 2

The solution is made up and concentrated exactly as in Example 1, except that the evaporation is stopped while the magma still contains 250 cc. of water. The whole is then cooled with stirring to a final temperature of 17° C. After some ten hours' time it is centrifuged, washed and dried as before and titrates above 109% as the hydrated acid. In the operation of the process according to this example, it is advisable to leave a greater amount of water in the magma to offset the greater viscosity at lower temperatures.

In the concentration to saturation of any aqueous citric acid solution, higher boiling temperatures requiring lesser degrees of vacuum may be used; but in evaporating from the magma, and throughout this new process, we prefer to avoid boiling at a temperature above 65° C. In general, boiling temperatures lower than 41° C. are not practical because (1) The necessarily high vacuum required is uneconomical when a lower vacuum will perform the same service;

(2) Boiling below 41° C. makes it unnecessarily difficult to ensure complete elimination of hydrated citric acid.

Applicants append a graph showing solubility of anhydrous citric acid at temperatures within the claimed range of 41° C. to 5° C. In obtaining the experimental results recorded by the graph, each magma was agitated at constant temperature for at least five hours before determining the solubility at that temperature. It was found that considerably longer stirring periods (up to 24 hours) were necessary for the attainment of equilibrium at lower temperatures. The regularity of the graph (in fact a straight line) shows that equilibrium solubility was attained in each determination. From the graph, therefore, yields of anhydrous citric acid to be expected at any given temperatures may be readily calculated. As before mentioned, a certain minimum amount of water should be retained in the magma in order to keep it of workable consistency and to carry off impurities. Obviously the desirable proportion of water is larger when working with impure solutions or cooling to low temperatures.

The invention claimed is:

1. Process for preparing crystalline anhydrous citric acid from a magma of citric acid prepared above 41° C. which comprises operating in a closed system to completely exclude hydrated citric acid while crystallizing and separating solely anhydrous citric acid at temperatures between 41° C. and 5° C.

2. Process for preparing crystalline anhydrous citric acid from a magma prepared at above 41° C. which comprises isolating and drying the anhydrous product in a sealed system which excludes citric acid monohydrate.

3. Process for preparing crystalline anhydrous citric acid from a magma prepared at above 41° C., by continuing the crystallization at temperatures between 41° C. and 5° C. within a closed system to exclude citric acid monohydrate and thereby preventing rehydration of the anhydrous citric acid while in contact with the mother liquor.

4. In the preparation of crystalline anhydrous citric acid, the step of excluding hydrated citric acid by operating within a closed system while continuing at temperatures between 41° C. and 5° C. the crystallization of anhydrous citric acid from a magma prepared above 41° C.

RICHARD PASTERNACK.
JOHN C. L. BLAGG.